United States Patent [19]

McGann

[11] Patent Number: 5,119,506
[45] Date of Patent: Jun. 2, 1992

[54] CIRCUIT FOR AUTOMATICALLY ADJUSTING THE RATE OF CHANGE OF AMPLITUDE OF AN OUTPUT SIGNAL OVER SELECTED INPUT SIGNAL AMPLITUDE BANDS

[75] Inventor: Melvyn McGann, Chelmsford, United Kingdom

[73] Assignee: The Marconi Company Limited, Stanmore, United Kingdom

[21] Appl. No.: 254,619

[22] Filed: Oct. 7, 1988

[30] Foreign Application Priority Data

Oct. 10, 1987 [GB] United Kingdom ............... 8723874

[51] Int. Cl.$^5$ .................. H04B 1/04; H04N 5/38; H03F 3/54
[52] U.S. Cl. .................. 455/116; 455/127; 358/186; 330/44
[58] Field of Search .......... 455/108, 115–116, 455/126–127, 109; 358/174, 186, 139; 330/44–45, 149; 307/262, 264, 270, 296.1, 360–361, 350; 332/160

[56] References Cited

U.S. PATENT DOCUMENTS

| | | |
|---|---|---|
| 3,277,318 | 10/1966 | Bedford . |
| 4,227,216 | 10/1980 | Blom .................. 358/164 |
| 4,392,252 | 7/1983 | Cluniat ................ 358/186 |
| 4,470,068 | 9/1984 | Plume ................. 358/186 |
| 4,670,789 | 6/1987 | Plume ................. 358/186 |
| 4,905,086 | 2/1990 | Tahara ............... 358/186 |

FOREIGN PATENT DOCUMENTS

| | | |
|---|---|---|
| 5486666 | 10/1982 | Australia . |
| 149319 | 7/1985 | European Pat. Off. . |
| 0139425 | 6/1987 | Japan ............... 455/126 |
| 1015806 | 1/1966 | United Kingdom . |
| 1086533 | 10/1967 | United Kingdom . |
| 1191886 | 5/1970 | United Kingdom . |
| 1208704 | 10/1970 | United Kingdom . |
| 1289005 | 9/1972 | United Kingdom . |
| 1297060 | 11/1972 | United Kingdom . |
| 1525532 | 9/1978 | United Kingdom . |
| 2153173 | 8/1985 | United Kingdom . |

OTHER PUBLICATIONS

"Adaptive Contrast Corrector Using Real-Time Histogram Modification", Favreau et al SMPTE Journal May 1984.

Primary Examiner—Reinhard J. Eisenzopf
Assistant Examiner—Andrew Faile
Attorney, Agent, or Firm—Spencer, Frank & Schneider

[57] ABSTRACT

A linearity correction circuit for television transmission operates at intermediate frequency to introduce appropriate pre-distortion into the amplitude envelope to compensate for non-linearity in the power amplifier states. An array of parallel current sources (11), each of which is independently adjustable in response to the perceived requirement for pre-distortion over a corresponding amplitude band, to inject a current sufficient to introduce an appropriate differential voltage at the output. The circuit provides for the independent correction of each amplitude band, so that it is capable of operation under microprocessor control in real time.

6 Claims, 3 Drawing Sheets

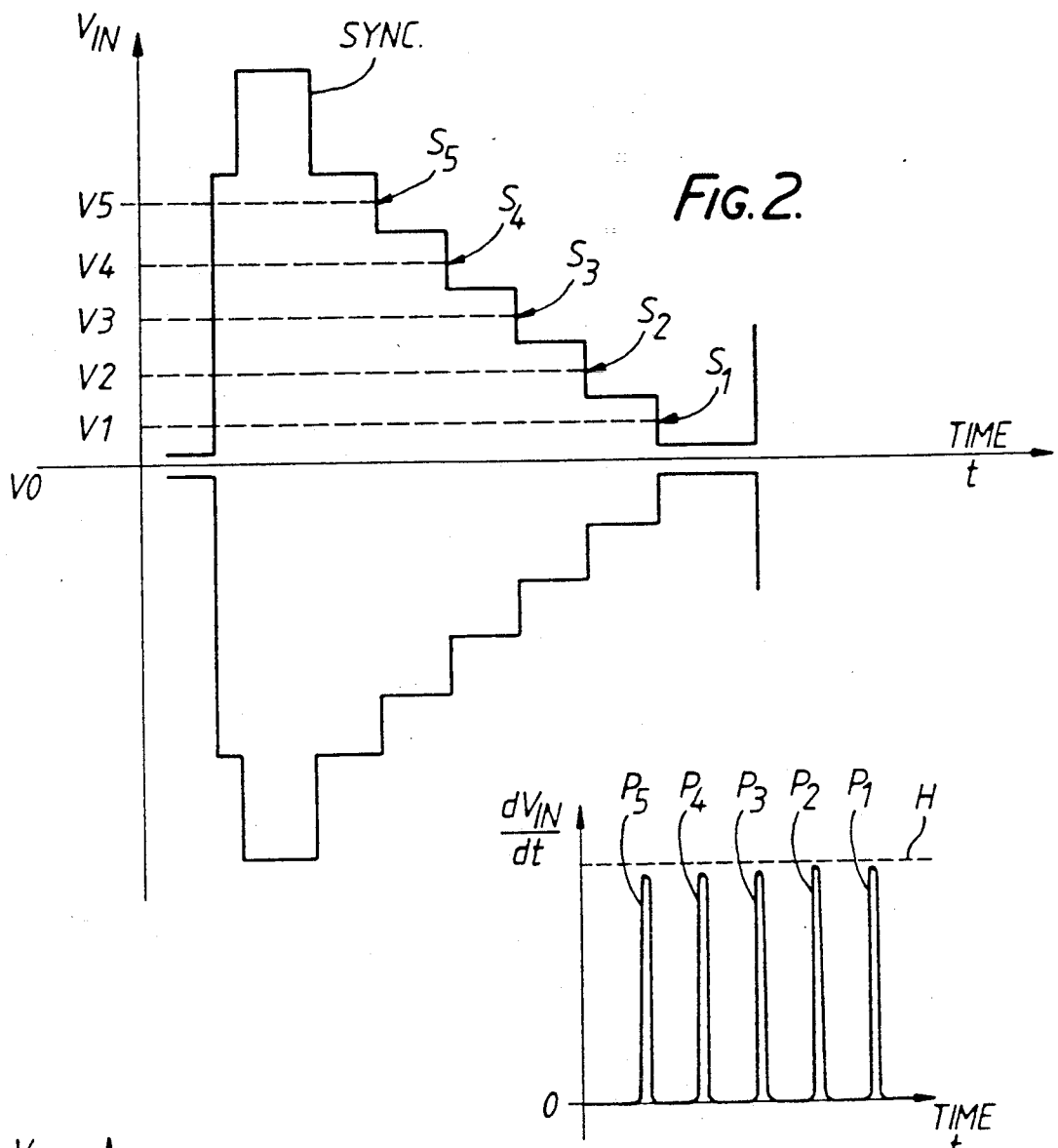
FIG. 2.
FIG. 3.
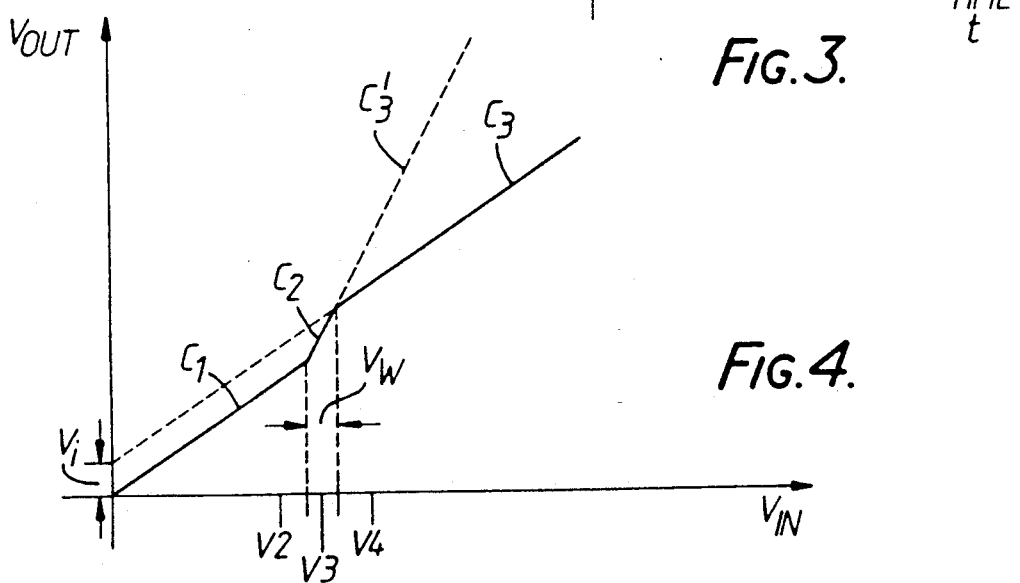
FIG. 4.

CIRCUIT FOR AUTOMATICALLY ADJUSTING THE RATE OF CHANGE OF AMPLITUDE OF AN OUTPUT SIGNAL OVER SELECTED INPUT SIGNAL AMPLITUDE BANDS

BACKGROUND OF THE INVENTION

This invention relates to a linearity-adjusting circuit for adjusting, usually correcting, the rate of change of amplitude of an output signal with respect to the amplitude of an input signal from which the output signal is derived. In most applications the output signal amplitude is nominally proportional to the input signal amplitude. The invention is particularly useful, for example, in a high frequency pre-distortion circuit for signals which are to undergo amplification in power amplifiers, such as klystrons which are used in television transmission. Klystrons, and indeed many high power amplifiers and the like, introduce undesirable signal distortions, and a linearity-correcting circuit is required for ensuring a linear amplitude relationship between the envelope of the modulated and power-amplified transmission signal and the video input signal which was used in the initial modulation process.

In some existing colour television transmitter chains, an appropriate pre-distortion is introduced into the intermediate frequency signal before the waveband-dependent radio frequency stage, for linearity correction. To obtain the correct amount of pre-distortion over the full amplitude range, variable impedances or other elements of the pre-distortion circuit are adjusted manually until the envelope of the transmitted signal has a sufficiently linear relationship with the envelope of the input modulated signal, over the entire range of envelope amplitudes. Since the characteristics of the transmitter chain vary in operation with supply voltage levels and ambient temperature amongst other things, it is found that re-adjustment of the circuit elements is necessary quite frequently. If the non-linearity occurs only over a narrow band of amplitudes, it is found that adjustment of just one circuit element may be sufficient to correct this particular non-linearity, but that it then introduces non-linearities at other amplitude levels. Consequently, even for a slight correction, it is necessary to adjust more than one of the circuit elements. Moreover, because of the interdependence of the settings of the circuit elements, they frequently require more than one adjustment to compensate for each change in power-amplifier characteristics; considerable skill and experience is required in order to judge the degree of adjustment required.

SUMMARY OF THE INVENTION

The purpose of the present invention is to provide a linearity-adjusting circuit which is capable of automatic control, i.e. without the need for manual adjustment; such a circuit may then be used in a transmitter chain under microprocessor control, in response to an automatic and periodic monitoring of the transmitted signal resulting from test signals. It was considered that, with existing hardware, any software solution to the problem would require a substantial computing capability to implement, and that changes in the hardware might render the software solution much simpler.

The invention provides a linearity-adjusting circuit for adjusting the rate of change of amplitude of an output signal with respect to the amplitude of an input signal from which the output signal is derived (the output signal amplitude preferably being nominally proportional to the input signal amplitude) comprising, for each of several bands of the input signal amplitude, means for selectively introducing a differential voltage to the output signal amplitude over that amplitude band, such that the mean rate of change is changed accordingly only over that amplitude band, and control means for selecting over which amplitude bands to introduce such differential voltages and for determining the magnitudes of such differential voltages, to achieve a predetermined linearity variation for the whole amplitude range.

The invention enables the gain of any amplitude band of a transmitter chain to be adjusted (usually by way of correction) independently of the other amplitude bands, so that the variation of gain in that amplitude band does not itself introduce gain variations in other amplitude bands which would then require correction also. This independent treatment of the various amplitude bands allows the said control means to be automated much more simply, and it may for example comprise a microprocessor control unit.

In another aspect, the invention provides a transmitter chain comprising a linearity-correcting circuit according to the first aspect of the invention described above, means for detecting the amplitude of the transmitted signal, and control means responsive to the said detecting means for setting the levels of the said differential voltages so as to introduce an appropriate pre-distortion to correct the linearity. In use, colour television transmitters, for example, transmit an inserted test signal, in each frame, modulated with an envelope in the form of a staircase. Using such a test signal, the detecting means of this aspect of the invention demodulates and then differentiates the staircase signal to provide a series of narrow pulses whose heights are nominally equal. The heights of the pulses are compared with a predetermined value representing the height they should be for correct linearity at that particular amplitude band. In response to this comparison, the control means sets the level or levels of differential voltage required for correction over the or each respective amplitude band. The linearity-adjusting circuit thus compensates for the detected non-linearity by introducing the appropriate pre-distortion. Such corrections may be carried out regularly and frequently, so that the transmitter chain is capable of responding quickly to changes in the characteristics of the transmitter due to temperature or supply voltage fluctuations.

Two ways in which the invention may be performed will now be described, by way of example only, with reference to the accompanying drawings.

BRIEF DESCRIPTION OF THE DRAWINGS

FIG. 2 illustrates the amplitude envelope of a staircase test signal in a colour television transmission;

FIG. 3 illustrates the differential, with respect to time, of a portion of the demodulated test signal of FIG. 2;

FIG. 4 is a graph of output amplitude against input amplitude for the circuit of FIG. 1.

DETAILED DESCRIPTION OF PREFERRED EMBODIMENTS

Figure 1:
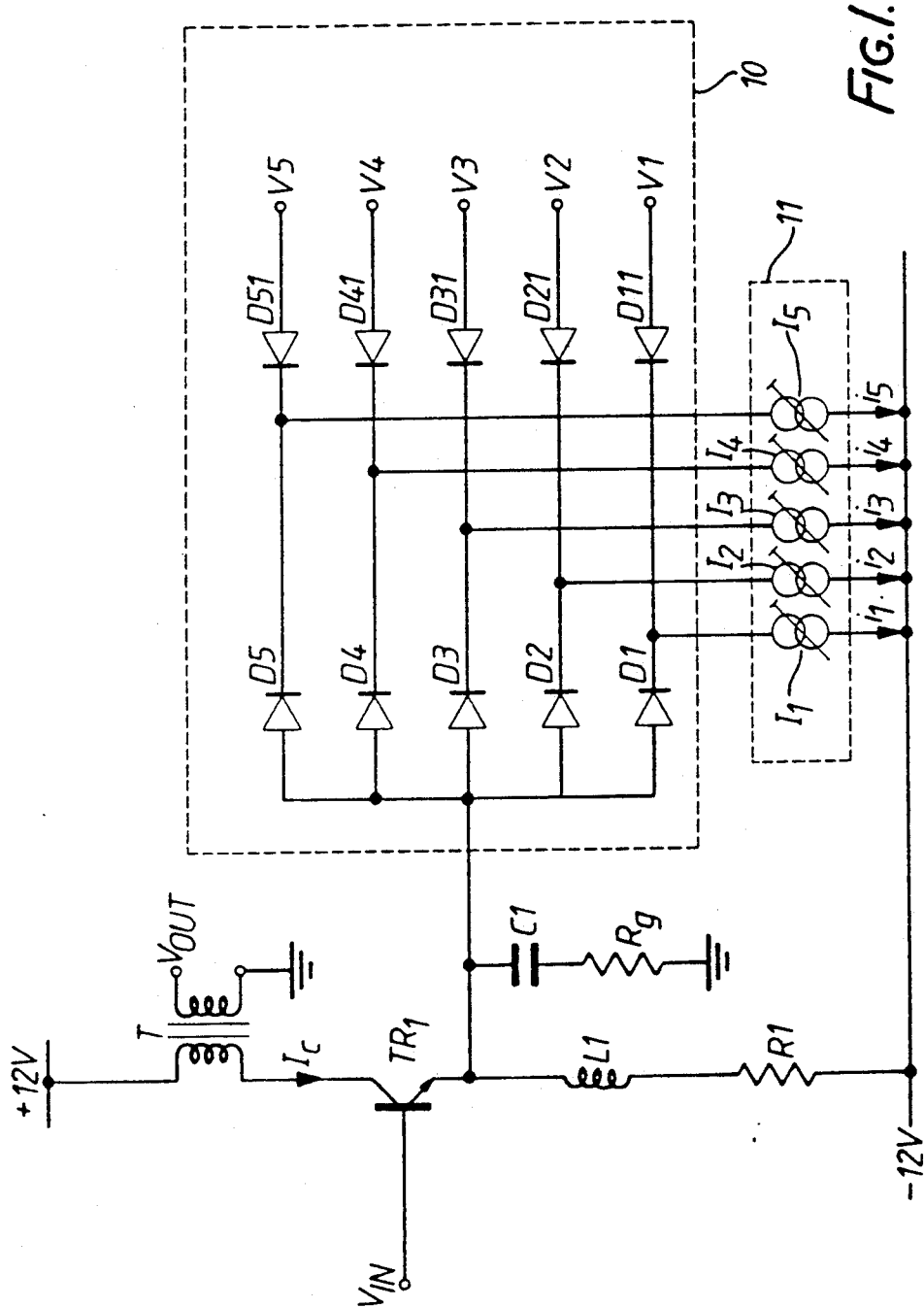
FIG. 1 is a circuit diagram of a linearity-correcting circuit embodying the invention.

The linearity-correcting circuit of FIG. 1 forms part of an intermediate frequency corrector unit in a colour television transmission chain. In this example, the colour video signal is used to modulate a 38.9 MHz carrier signal using amplitude modulation. The amplitude-modulated signal is filtered in a vestigial side band filter and then pre-distorted in the intermediate frequency corrector unit to compensate for the distortions which are anticipated to occur in the later stages of the transmission chain. The corrected signal is then mixed with a carrier wave from a heterodyne oscillator to produce an RF signal which is amplified and then delivered to a power amplifier, for example a klystron, for transmission from an antenna at, for example, 40 kW.

The intermediate frequency corrector unit, operating at intermediate frequency, remains band-independent and channel-independent, and consequently the same correction circuits can be used in many different applications. The intermediate frequency corrector unit includes circuits which compensate for differential phase distortion and differential gain distortion, which are described for example in our UK Patent No. 2153173 and our U.S. Pat. No. 4604589, but which are not illustrated or described in the present specification.

With reference to FIG. 1, the vision intermediate frequency signal, at an amplitude $V_{in}$, is input to a linearity-correcting circuit, whose output amplitude $V_{out}$, having undergone a pre-distortion appropriate for the required linearity correction, is provided to other correction circuits of the intermediate frequency corrector unit.

The input voltage $V_{in}$ is applied to the base of a transistor $TR_1$ whose collector is connected to a $+12$ volts supply by way of a transformer T whose other winding provides the output signal $V_{out}$. The emitter of transistor $TR_1$ is connected to a $-12$ volts supply potential by way of an inductance L1 and resistance R1, for D.C. biasing, and to earth by way of a blocking capacitor C1 and a gain-control resistor $R_g$.

Several, in this case five, alternative current paths between the emitter of transistor TR1 and the $-12$ volts supply are provided in parallel by an array 11 of current sources 11 to 15 controlled by an array 10 of diodes. Each current source $I_1$ ($I_2$, $I_3$, $I_4$, $I_5$) is connected via a corresponding diode D11 (D21, D31, D41, D51) to a corresponding different supply potential V1 (V2, V3, V4, V5); and also to the emitter of transistor $TR_1$ via a respective diode D1 (D2, D3, D4, D5) whose polarity is reversed with respect to the first-mentioned diode. The supply potentials V1 to V5 form a regular series of increasing levels, selected in accordance with levels of the staircase steps of an inserted test signal (described below), and in this example are respectively 7.1 volts, 8.1 volts, 9.1 volts, 10.1 volts and 11.1 volts. The centre level VO is 6.0 volts.

Current source $I_1$ draws current through diode D11 when the transistor emitter voltage is lower than V1, but through diode D1 when the emitter voltage is above V1. The other current sources 12 to 15 operate in a similar manner; thus, when the emitter voltage exceeds V5, all five current sources draw current from the transistor emitter. The current il ($i_2$, $i_3$, $i_4$, $i_5$) provided by the respective current source I1 (I2, I3, I4, I5) is effectively added to the transistor collector current $I_c$, which in turn determines the amplitude of the output signal $V_{out}$. Thus pre-distortions are introduced in discrete steps over 5 amplitude bands. The current sources I1 to I5 are all independently variable, either manually or, preferably, under microprocessor control, in response to the varying amplitude characteristic of the transmission signal provided by the power amplifier, to provide the correct levels of pre-distortion to compensate for the distortion in the power amplifier.

Colour television transmissions conventionally include an inserted test transmission (mentioned above) comprising a synchronisation pulse followed by a staircase, one in every field of the transmitted signal, as shown in FIG. 2. The staircase portion comprises six amplitude levels joined by nearly vertical slope portions $S_1$, $S_2$, $S_3$, $S_4$ and $S_5$ respectively, whose mid-points have potentials V1, V2, V3, V4 and V5. These slope portions are nominally of the same gradient and height. The colour subcarriers are not shown. This test transmission is used to monitor the linearity of the transmitter chain by observing the effect of the power amplifier on the slopes $S_1$ to $S_5$ of the test signal. The slopes vary in proportion to the change in the rate of change of output amplitude with input amplitude, i.e. they represent the degree of non-linearity, at the relevant amplitude band. This monitoring is conventionally performed by feeding back the transmission signal, either from the power amplifier output or from a television receiver, to a control circuit which demodulates and then differentiates, with respect to time, the staircase portion of the test signal, the result of which is shown in FIG. 3. In FIG. 3, peaks $P_1$ to $P_5$ correspond respectively to slopes $S_1$ to $S_5$, and are nominally of the same height H. Distortion in the power amplifier is manifested by a deviation of one or more of these peaks from the expected height H: in FIG. 3, peaks $P_3$, $P_4$ and $P_5$ are slightly lower than the expected level H, indicating that a predistortion is required in the linearity-correcting circuit of the transmitter chain.

The linearity-correcting circuit of FIG. 1 is capable of correcting for non-linearity over any one of the five voltage bands centred at V1, V2, etc., independently of all the other voltage bands, simply by varying the corresponding current source independently of the other current sources in the bank 11 of current sources. Firstly, the circuit detects the levels of the steps of the staircase, computes the mid-slope levels V1 to V5, and then sets the supply potentials of the diode bank 10 accordingly. Then in order to correct the linearity over the voltage band centred at V3, for example, the peak $P_3$ is compared with the nominal level H, and the current source I3 is adjusted in accordance with the difference, in a direction such as to minimise that difference. In this example, peak $P_3$ is too low, and accordingly the current $i_3$ of current source I3 is increased accordingly. Subsequent test signals are again monitored, and the whole process repeated; any residual error in the height of peak $P_3$ is again corrected by a further change in current source I3.

The effect of such a correction on the output amplitude $V_{out}$ for the expected range of input amplitudes $V_{in}$ is illustrated diagrammatically in FIG. 4. It is assumed, in the example of FIG. 4, that the transmitter chain is perfectly linear over most input voltages, as represented by portions $c_1$ and $c_3$ of the graph. By increasing the current source I3, however, the slope $c_2$ of the graph near input voltage V3 is increased, so as to introduce the appropriate amount of pre distortion. It will be appreciated that the width $V_w$ of the band over which the slope $c_2$ is changed need not necessarily be equal to the difference between the steps of the staircase adjacent voltage $V_3$, so long as the mean rate of change of voltage is changed appropriately over that band; the value of $V_w$ will depend on the forward drops of the diodes D3 and D31. The nominal slope $c_1$ is determined by the value of the resistor $R_g$. The value of the increase $V_i$ in output voltage caused by the adjustment is determined by the current $i_3$ and the effective A.C. load seen by the collector of TRI, which is set by the load on the transformer and its turns ratio.

In existing linearity-correcting circuits which do not employ current sources for individual voltage bands, the slope in FIG. 4 for the higher voltage bands would also vary as a result of the adjustment made for the band centred at $V_3$, and the slope $c_3$ might instead be the slope $c'_3$ as shown in broken lines. This would then necessitate corresponding corrections for input voltages centred at $V_4$ and above.

The second, and preferred embodiment of the invention will now be described with reference to FIG. 5. The linearity-correcting circuit of FIG. 5 comprises two circuits of the type shown in FIG. 1, and similar parts are given the same reference numerals.

The transistor $TR_1$, diode bank 10 and current source array 11, resistor $R_g$, resistance R1 and inductance L1 are the same as the corresponding components of the circuit of FIG. 1. A similar second circuit, comprising transistor $TR_2$, diode bank 101, current source array 111, bias resistor $R'_g$, resistance and inductance L1' is connected in parallel. The collectors of the two transistors are connected across the output transformer T, to which the +12 volts supply is connected at a central tapping point. The current sources are switched individually in a switch control unit 12 such that, for each of the 5 amplitude bands, the appropriate current source in either array 11 or array 111, but not both, is connected to the −12 volts level.

A detector 200 receives an output signal from the power amplifier and processes the signal to determine the amplitude envelope resulting from the staircase portion of the test transmissions. This amplitude envelope is then fed to a control processor 300 which differentiates the envelope to derive the levels of the peaks $P_1$ to $P_5$ (FIG. 3), and to determine what changes are required to one or more of the currents "injected" by the current sources.

The current sources, in this example, are high resistances, of 18 kilo-ohms, connected to variable voltage sources, but alternatives would be active constant current circuits in series with chokes. The switch control unit 12 is a diagrammatic representation of the switching function, and in practice the switches are integrated with the current source arrays 11, 111. The diodes require rapid speed of operation and low forward drop, and in this example are hot carrier diodes; alternatively, however, they could be silicon diodes.

The two transistors $TR_1$ and $TR_2$ are driven such that the output voltage $V_{out}$ depends on the difference between their collector currents by subtraction in the transformer T. This enables either positive or negative changes in the slopes to be made: the circuit of FIG. 1 alone is not capable of reducing the slopes, i.e. reducing the rates of change of output voltage with input voltage. The magnitude of the change is determined, as before, by adjustment of the appropriate current source, by means of a signal from the control processor 300. The direction of the change is determined by switching on the appropriate current source either in bank 11 or in bank 111, using control signals sent to the switch control unit 12 from the control processor 300.

Figure 5:
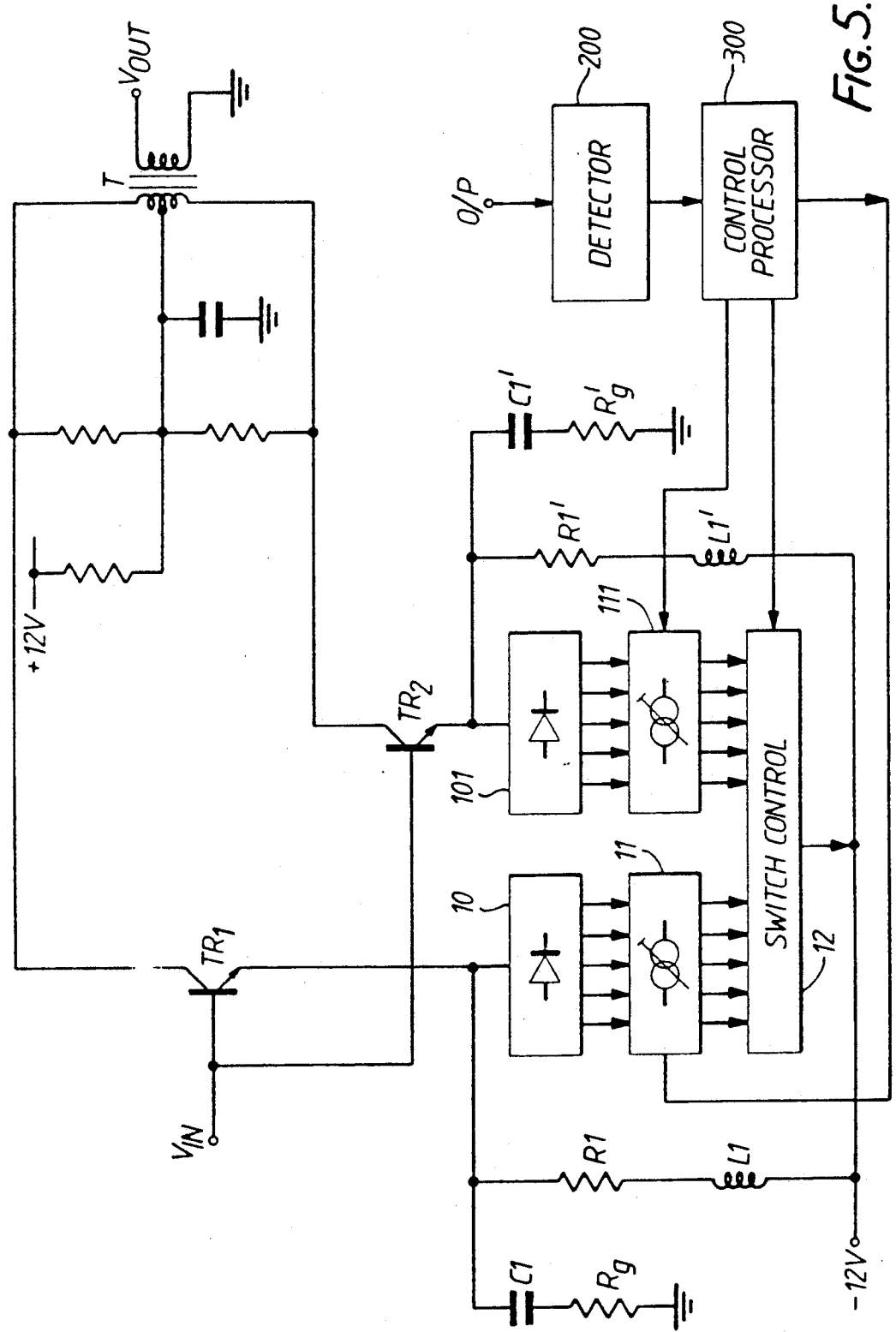
FIG. 5 is a circuit diagram of a further linearity-correcting circuit embodying the invention.

A further advantage of the circuit of FIG. 5, compared with that of FIG. 1, is that the effect of stray capacitance at the transistor emitters is reduced by the way in which the two transistor circuits are connected in anti-phase. Stray capacitance in the circuit of FIG. 1 reduces the independence between the effects of the adjustment of the different current sources. Stray capacitance could be reduced further by integrating the whole linearity-correcting circuit on one chip.

The linearity-correcting circuits of FIGS. 1 and 5 do not require the baseband component of the input signal to be divided out, as is the case with many existing such circuits, but rather receives the intermediate frequency component and responds to its amplitude envelope. However, these circuits embodying the invention are still capable of operating at lower input signal frequencies, e.g. at video frequency or even down to D.C. (provided that a resistance were used in place of the transformer T).

Although the invention has been illustrated in the context of television transmission, it has many other applications. The invention may be used for linearity correction in any system whose output is nominally proportional to the input for a range of input amplitudes, and is not limited to amplitude-modulated carrier signals. The invention could, for example, be used in direct-current amplification, where a D.C. output signal potential is nominally proportional to that of a D.C. input signal.

Further, although the invention has been illustrated in the form of a linearity-correcting circuit, the invention could be embodied in a circuit for test purposes which deliberately introduces linearity distortion into a signal, for example to simulate a particular power-amplifier. amplifier. Indeed, the principle of the invention is applicable to circuits in which the output amplitude is not necessarily nominally proportional to the input amplitude, for example circuits for synthesising any desired gain-amplitude profile.

I claim:

1. A linearity-adjusting circuit for independently adjusting the rate of change of amplitude of an output signal with respect to the amplitude of an input signal from which the output signal is derived for each of several bands of the input signal amplitude, said linearity-adjusting circuit comprising for each of said bands:

means for selectively introducing a differential voltage to the output signal amplitude over a selected amplitude band, such that the means rate of change is changed accordingly only over that amplitude band;

means for amplifying said input signal to derive said output signal, said differential voltage introducing means being coupled to said amplifying means for adjustment of the gain thereof as a function of said input signal amplitude, said differential voltage introducing means comprising one of a plurality of adjustable constant current sources each arranged to introduce to said amplifying means a differential current over that amplitude band; and control means coupled to said differential voltage introducing means for selecting over which amplitude bands to introduce such differential voltages and for determining the magnitudes of such differential voltages thereby to adjust the rate of change of amplitude of the output signal of each band independently of the other bands to achieve a predetermined variation of the amplitude of the output voltage with respect to the amplitude of the input voltage over all of said amplitude bands.

2. A circuit according to claim 1, wherein each adjustable constant current source is connected to the amplifying means via a respective diode which is coupled to a voltage source at such a level that the diode is biased into conduction only when the input signal has reached its said predetermined amplitude.

3. A linearity-adjusting circuit for independently adjusting the rate of change of amplitude of an output signal with respect to the amplitude of an input signal from which the output signal is derived for each of several bands of the input signal amplitude, said linearity-adjusting circuit comprising for each of said bands:

means for selectively introducing a differential voltage to the output signal amplitude over a selected amplitude band, such that the mean rate of change is changed accordingly only over that amplitude band;

means for amplifying said input signal to derive said output signal, said differential voltage introducing means being coupled to said amplifying means for adjustment of the gain thereof as a function of said input signal amplitude, said input signal comprising an amplitude-modulated carrier being an amplitude whose modulation envelope determines the gain of said amplifying means, said differential voltage introducing means comprising one of a plurality of adjustable constant current sources each arranged to introduce to said amplifying means a differential current over that amplitude band; and control means coupled to said differential voltage introducing means for selecting over which amplitude bands to introduce such differential voltages and for determining the magnitudes of such differential voltages thereby to adjust the rate of change of amplitude of the output signal of each band independently of the other bands to achieve a predetermined variation of the amplitude of the output voltage with respect to the amplitude of the input voltage over all of said amplitude bands.

4. A circuit according to claim 3, wherein each adjustable constant current source is connected to the amplifying means via a respective diode which is coupled to a voltage source at such a level that the diode is biased into conduction only when the input signal has reached its said predetermined amplitude.

5. A linearity-adjusting circuit for independently adjusting the rate of change of the amplitude of an output voltage with respect to the amplitude of an input voltage from which the output voltage is derived for each of a plurality of input voltage bands of different amplitudes comprising:

a transistor for receiving said input voltage said output voltage being generated by a current flowing through said transistor;

a plurality of constant current sources, the current generated by each of said constant current sources being independently adjustable; and a diode array comprising first and second diode circuits, each of said constant current sources being coupled by a diode of said first diode circuit to said transistor and by a diode of said second diode circuit to a corresponding supply voltage, the current generated by a constant current source being added to the current flowing through said transistor when the voltage applied by said transistor to a corresponding diode of said first diode circuit exceeds the supply voltage applied to a corresponding diode of said second diode circuit, whereby the rate of change of the amplitude of the output voltage over each of said input voltage bands is adjusted independently of the others of said input voltage bands.

6. A circuit according to claim 5 wherein said transistor has base, emitter and collector electrodes, and wherein the input voltage is coupled to said base, the diode of said first diode circuit are coupled to said emitter and an output circuit for generating said output voltage is coupled to said collector.

* * * * *